United States Patent [19]
Perison, Sr.

[11] 3,776,618
[45] Dec. 4, 1973

[54] SHATTER-PROOF REAR VISION MIRROR ASSEMBLY FABRICATION

[75] Inventor: Ronald C. Perison, Sr., East Aurora, N.Y.

[73] Assignee: Standard Mirror Company, Inc., Buffalo, N.Y.

[22] Filed: Mar. 6, 1972

[21] Appl. No.: 232,117

[52] U.S. Cl................ 350/288, 350/307, 350/320
[51] Int. Cl. .............................................. G02b 5/08
[58] Field of Search................... 350/288, 303, 304, 350/307, 320

[56] References Cited
UNITED STATES PATENTS

| | | | |
|---|---|---|---|
| 3,383,152 | 5/1968 | Ward | 350/288 |
| 3,427,095 | 2/1969 | Dykema et al. | 350/288 |
| 3,391,895 | 7/1968 | Bausch et al. | 350/288 |

Primary Examiner—David Schonberg
Assistant Examiner—Michael J. Tokar
Attorney—Sommer, Weber & Gastel

[57] ABSTRACT

A shatter-proof rear vision mirror assembly is fabricated from a pre-formed plastic casing molded with a mounting in situ and having a cavity into which is poured a self-foaming liquid prior to closing of the cavity by installation of a mirror panel, whereupon the casing and panel act as a mold in which the liquid foams to form a foamed in situ backing filling the cavity between and bonded to both the casing and panel.

8 Claims, 9 Drawing Figures

PATENTED DEC 4 1973

PATENTED DEC 4 1973

SHATTER-PROOF REAR VISION MIRROR ASSEMBLY FABRICATION

BACKGROUND OF THE INVENTION

1. Field of the Invention

This invention relates to improvements in rear vision mirror assembly fabrication and more particularly a new and improved shatter-proof rear vision mirror assembly and a new and improved method of fabricating the same.

2. Description of the Prior Art

In the fabrication of rear vision mirror assemblies, and particularly those mounted within the vehicle, the factor of safety looms large, especially for protection of the driver and front seat occupants, in the event of a collision. Hence, various attempts have been made to render such assemblies safer, particularly by increasing the shatter resistance of the glass mirror panels thereof.

For example, U.S. Pat. No. 3,508,815, discloses such a rear vision mirror assembly wherein both the mirror panel and the internal metal shell housing the ball and socket type mirror mounting are bonded to a resilient casing of thermo-plastic foam material for shatter-proofing purposes. In addition, such casing is provided with a flexible skin bonded to one or each of the aforesaid three elements and which is alleged to act as a sort of anti-vibration housing for the assembly.

While this patent does not disclose just how the assembly is fabricated, the probability is that the foamed casing is expanded within a mold (not shown), with the mirror panel and/or mounting housing being pre-positioned and embedded in situ. Apparently, the skin forms during the molding, and hence it would appear that both the mirror panel and mounting shell are embedded in situ during molding, in the embodiment of FIG. 2, while only the mounting shell is so embedded during molding in the embodiment of FIG. 3, with the panel being inserted immediately thereafter to obtain the desired bonding effect, although this is in nowise clear from the patent.

In any event, this patent clearly lacks any suggestion of a casing into which self-foaming liquid is poured prior to installation of a mirror panel, as in the present invention, wherein the casing and panel act as a mold per se to confine the foaming liquid. Thus, the patented assembly not only is more subject to undesirable vibrations, because of the highly flexible and resilient nature of both the foamed casing and thin skin thereon, and the fabrication thereof requires rather intricate molding equipment and fixtures.

U.S. Pat. No. 3,427,094, which is referred to in the first mentioned patent, primarily is directed to the construction and operation of the day-night adjusting mechanism shown in both patents, but does make brief reference in column 6, lines 60–67 to the plastic casing, which is shown in FIG. 9 as being solid not foam. Such brief reference at least implies that such plastic casing is molded around the mirror panel and mounting shell, as noted above, and hence this latter patent not only is subject to the fabrication intricacies of the first patent, but also its apparently solid plastic encapsulating casing obviously is heavier, denser and less shatter-resistant than the first patent, let alone the inventive assembly.

U.S. Pat. No. 3,448,553 discloses fabrication of an upholstered rear vision mirror assembly, wherein, as shown in FIGS. 4–8, a foam backing is molded over a preformed socket sub-frame and a mirror panel embedded in situ within specially designed molding apparatus. Once again, there is no suggestion of employing casing and a mirror panel as a self-contained mold for a self-foaming liquid, as in the present invention. Furthermore, the molded-in-place assembly of FIGS. 4–8 of the patent not only lacks the pre-formed casing of the invention and its inherently greater stability against vibration, but also, the pliant foamed backing beneath all or at least a major portion of the rear face of the mirror panel and the shatter-proof characteristics inherent in such structure. While this latter feature is improved in the embodiment of FIGS. 1–3 of this last-named patent, the assembly thereof is considerably more complicated and expensive, requiring the use of several intricately cut resilient foam slabs, an extra bezel or snap-over sub-frame for holding the mirror panel on the socket frame and heat sealing of an outer skin sketched over the whole assembly, while still lacking the vibrational stability inherent in the inventive structure.

U.S. Pat. No. 3,427,096 discloses a shatter-resistant rear view mirror assembly composed of a mirror panel provided with a foamed vinyl backing layer bonded to its rear face by a primer coating for use as a so-called caseless mirror. Alternatively, this sub-assembly could be inserted into a lightweight metal casing, or the primar coating could be eliminated by using polyurethane instead of vinyl. While this patent is effective against shattering of the glass mirror panel, it does not appear to be stable against vibrations, which stability is necessary for not only proper positioning of the mirror panel but also maintenance of such positioning for clear rear viewing, and it lacks any suggestion of the pre-formed casing of the inventive assembly, let along the unique fabricating sequence employed in fabricating such assembly.

Finally, U.S. Pat. No. 3,391,895 relates to a safety rear vision mirror assembly which is effective in resisting shattering of the mirror panel. However, this patent requires the interposition of an adhesive layer between the mirror panel and the metal backing plate forming part of the ball and socket type mounting arranged within a pre-molded or in-situ molded solid rubber or like casing, in order to provide the desired shatter-proofing. In addition, this assembly requires a relatively complex ribbed and slotted backing plate into which the adhesive or the in situ molded casing is keyed. These complications are eliminated by the invention, while substantially reducing fabrication costs.

SUMMARY OF THE INVENTION

Accordingly, a primary objective of the present invention is to provide a new improved shatter-proof rear vision mirror assembly which is so constructed and designed as not only to eliminate the various disadvantages of the aforesaid prior art devices but also to possess numerous advantages thereover, particularly as to shatter-proofing and vibrational stability as well as to efficiency and economy of fabrication, whether such inventive assembly be of the non-adjustable flat mirror type or of the adjustable (day-night) prismatic mirror type. To this end, the inventive assembly includes a casing, a mirror panel and a pliant foamed backing therebetween, wherein the improvement comprises: such backing being formed from self-foaming liquid poured into the casing prior to installation of the panel which closes the casing over the liquid and acts with the casing as a mold for confining the liquid during foaming.

Another objective is to provide a new and improved method of fabricating such shatter-proof rear vision mirror assembly, and which method is designed to eliminate the various disadvantages of the aforesaid prior art as well as to possess numerous advantages thereover, particularly as to producing such an assembly characterized by improved shatter-proofing and vibrational stability in a more efficient and effective manner, whether such assembly be of the adjustable or non-adjustable type. To this end, the inventive method is directed to the fabrication of such shatter-proof rear vision mirror assembly including a casing, a mirror panel and a pliant foamed backing therebetween, wherein the improvement comprises in sequence: pouring a self-foaming liquid into the casing, installing the mirror panel to close the casing over the liquid and to act with the casing as a mold confining the liquid during foaming, and foaming of the liquid to form the pliant backing between the casing and panel.

The foregoing and numerous additional and more specific objectives and advantages of the invention will become evident from the following detailed description and accompanying drawings.

DESCRIPTION OF THE PREFERRED EMBODIMENTS

Figure 1:
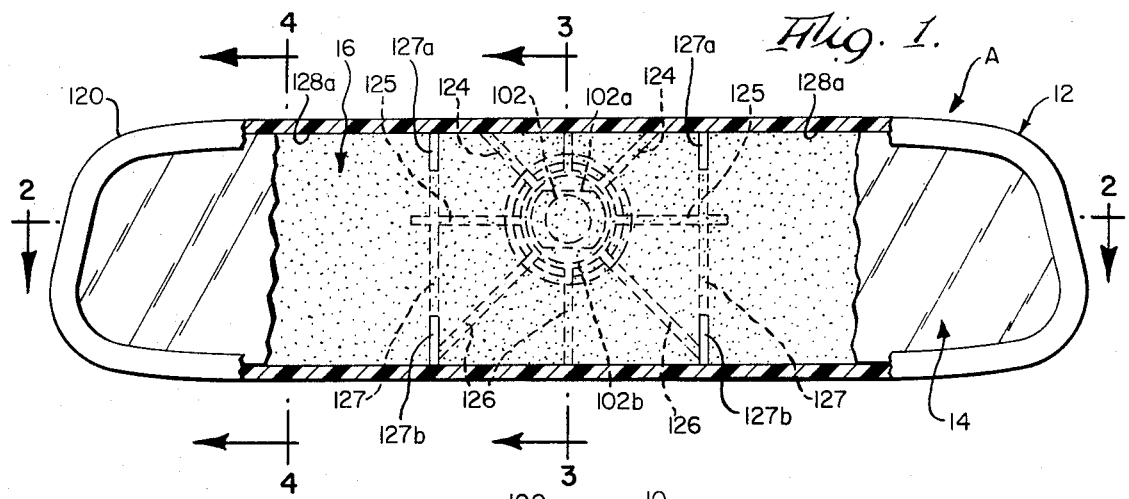
FIG. 1 is an elevational view with parts broken away in section taken from the mirror side of one preferred embodiment of the inventive shatter-proof rear vision mirror assembly (non-adjustable, flat mirror type), as fabricated by the inventive method.

Referring to the drawings, it is to be noted that the invention is applicable equally to either a flat or non-adjustable mirror containing assembly, as illustrated in FIGS. 1–4, or to an adjustable prismatic type, day-night mirror containing assembly, as illustrated in FIGS. 5–8.

FIGS. 1–4

Referring to FIGS. 1–4, the non-adjustable type rear vision mirror assembly as shown therein is composed basically of ball type mirror mounting 10, elongated casing 12, elongated flat mirror panel 14, and a pliant foamed backing 16 interposed between and bonded to both casing 12 and panel 14.

Figure 2:
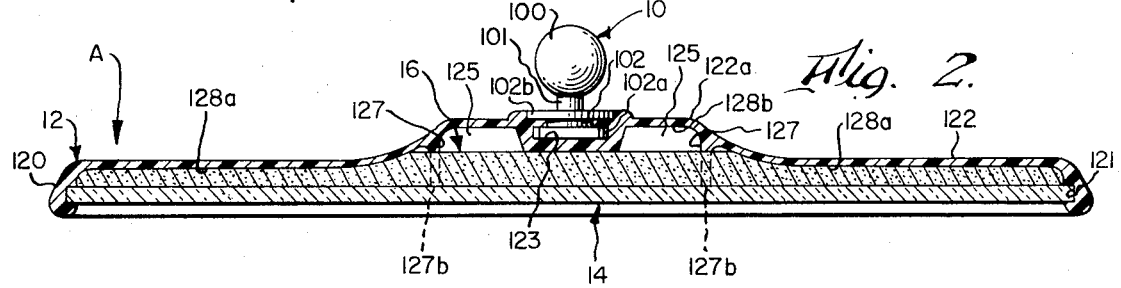
FIG. 2 is a section taken on line 2—2 of FIG. 1.
Figure 3:
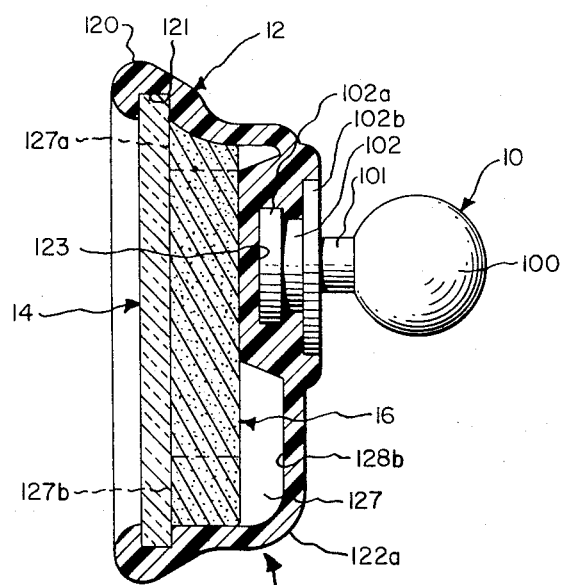
FIG. 3 is an enlarged section taken on line 3—3 of FIG. 1.
Figure 4:
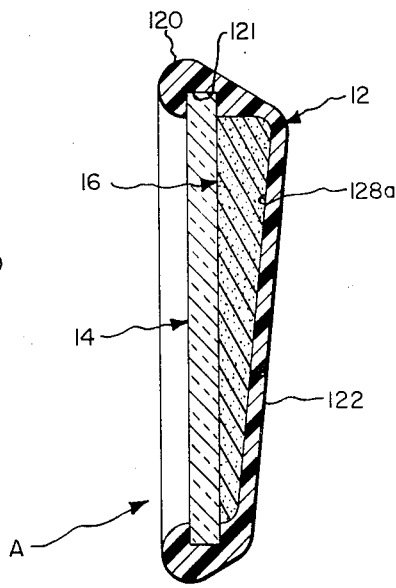
FIG. 4 is an enlarged section taken on line 4—4 of FIG. 1.
Figure 5:
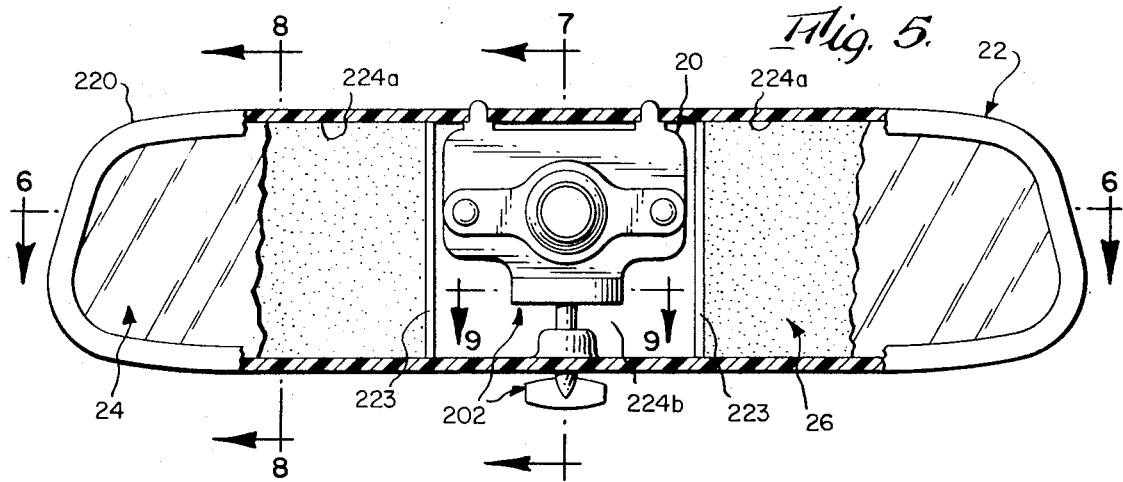
FIG. 5 is a partially broken away elevational view similar to FIG. 1, but illustrating another preferred embodiment of the inventive assembly (adjustable, day-night prismatic mirror type), as fabricated by the inventive method.
Figure 6:
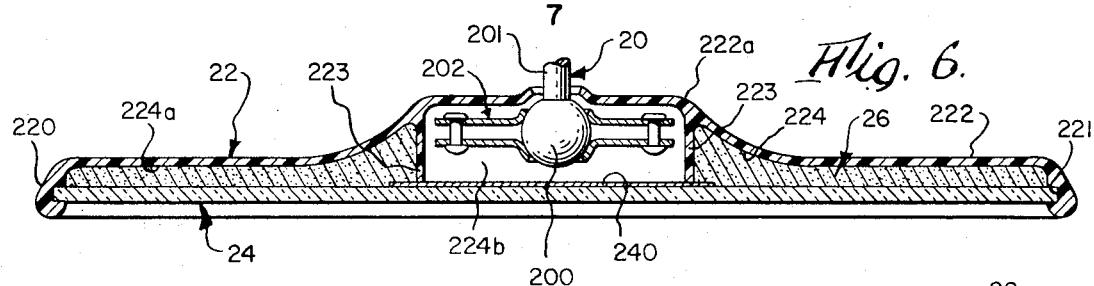
FIG. 6 is a section taken on line 6—6 of FIG. 5.
Figure 7:
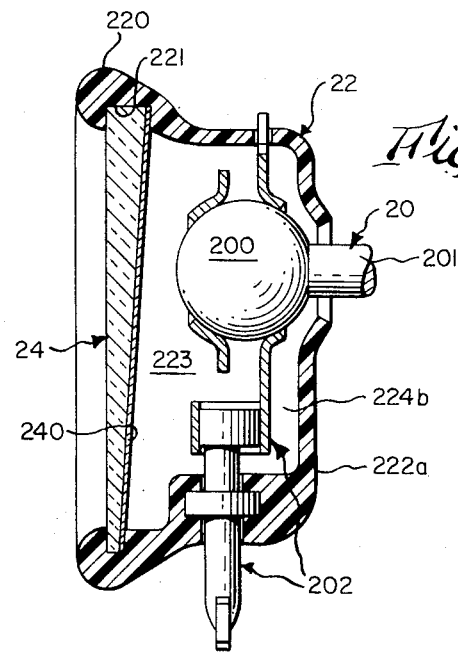
FIG. 7 is an enlarged section taken on line 7—7 of FIG. 5.
Figure 8:
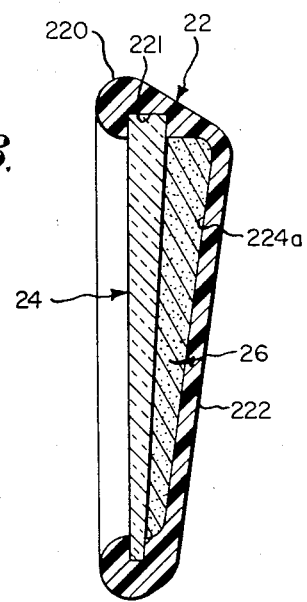
FIG. 8 is an enlarged section taken on line 8—8 of FIG. 5.
Figure 9:
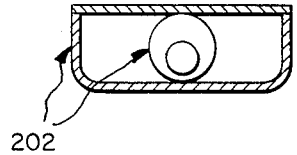
FIG. 9 is an enlarged section taken on line 9—9 of FIG. 5.

Mounting 10 includes a ball 100 having a stem 101 provided with a pedestal 102 having an enlarged inner collar 102a and a further enlarged outer collar 102b, with ball 100 being suitably attached to a windshield base (not shown) or header mount (not shown) such as by a double ball and socket type mounting shown in U.S. Pat. No. 3,367,616. Casing 12, which is preformed by molding to a semi-rigid shape from suitable plastic material, such as polypropylene or polyvinyl chloride, includes a peripheral wall 120 having internal groove 121 into which reflective mirror panel 14 is snapped, and a rear wall 122 having an enlarged and rearwardly offset or recessed central portion 122a containing a rearwardly open inset socket 123 having a shape complementary to pedestal 102 and its collars. This socket 123 and recessed central wall portion are reinforced by the following outstanding internal ribs, radiating upper ribs 124 (FIG. 1), horizontal or lateral ribs 125 and lower ribs 126, as well as outstanding internal vertical or upstanding wall portions 127 each having further outstanding or projecting upper lugs 127a and 127b which are adapted to contact and supportingly reinforce the rear or back of mirror panel 14 intermediate its ends (FIGS. 2 and 3).

In fabricating this mirror assembly, casing 12 is molded with pedestal 102 of mounting 10 being located in situ to form its various integral wall portions, 127 of which divide the casing cavity into two outer portions 128a and an enlarged central portion 128b. Next, self-foaming backing 16 is poured in liquid form into the cavity casing 12 followed by installation of mirror panel 14 by snapping periphery thereof into peripheral groove 121 in peripheral wall 120 of the casing. Thus panel 14 closes casing 12 over the liquid and acts with the casing as a mold confining the liquid during foaming. A suitable self-foaming liquid, such as polyurethane, is employed. In view of the fact that the liquid expands by about 30 to 40 to one upon foaming, only a small amount of liquid, on the order of a teaspoonful or so is required, and backing 16 formed thereby will fill and conform itself to the shape of the cavity between mirror panel 14 and casing 12, as well as bond to the adjacent surfaces of each.

At this point, it is to be noted that the liquid is free to foam throughout each of the three portions 128a and 128b of the cavity by virtue of the recesses between lugs 127a and 127b, and thereby provide the desired pliant backing for the mirror panel substantially over its entire rear side, such backing being bonded to the panel as well as the casing, in order to effectively prevent shattering of the panel upon impact. Likewise, it is to be noted that the pre-formed casing effectively provides vibrational stability for clarity in rear viewing, while the lightweight pliant backing confined between and bonded to the casing and panel acts as an effective shock absorber to reduce impact injury to occupants of the vehicle in which the assembly is installed.

FIGS. 5–8

As seen in FIGS. 5–8, the invention equally is applicable to an adjustable or day-night type mirror assembly, which basically includes mounting 20, elongated casing 22, elongated prismatic mirror panel 24 and pliant foamed backing 26, therebetween, the same materials being employed for the casing and backing, as in FIGS. 1–4. The mounting includes a ball 200 having a stem 201 for attachment to a base or support (not shown) on a windshield or the like (not shown), with the ball being seated in a finger-operated and cam-actuated mechanism 202 of the well-known construction shown (and the details of which form no part of the present invention) for shifting casing 22 and prismatic mirror panel 24 about ball 200 for the desired day or night use in known manner. While mechanism 202 illustrated is of the finger-operated rotatable type, it is obvious that any suitable adjusting mechanism may be employed, such as an oscillatory or other suitable type (not shown).

In this embodiment, casing 22 includes peripheral wall 220 having internal peripheral groove 221 and rear wall 222 provided with enlarged and rearwardly offset or recessed central portion 222a forming an enlarged central recess cavity portion 224b receiving and separating the mounting, including ball 200 and actuating mechanism 202 from backing 26. This central cavity portion or compartment is further defined by outstanding internal vertical or upstanding sidewall portions 223 which project forwardly and are adapted to engage and support the rear side of mirror panel 24 intermediate its ends, the central portion of which is provided with a covering layer of tape 240 or the like for shatter-proofing purposes. As will be evident, wall portions divide the casing cavity longitudinally into central portion 224b and the two outer portions 224a for a purpose to be described below.

Once again, in fabricating this assembly, casing 22 is molded to shape like casing 12, with the mounting, including ball 200 and day-night actuating mechanism 22, in situ. Next, a suitable quantity of the liquid foaming agent is poured into the outer portions 224a only of the cavity encasing 22 (to avoid fouling of the actuating mechanism), whereupon mirror panel 24 with tape 240 is snapped into place in groove 221. Upon completion of the foaming action, backing 26 fills these outer portions 224a of the cavity and bonds itself to both casing 22 and mirror panel 24, with the layer of tape 240 acting similiarly to the foamed backing material to prevent shattering of panel 24. In addition, it is to be noted that the layer of tape 240 extends a short distance laterally beyond the sidewall portions 223, so as to prevent shattering at the sidewalls. Obviously, this adjustable embodiment of the invention possesses the improved shatter-proofing, vibrational stabilizing and impact cushioning characteristics of that shown in FIGS. 1–4, with tape 240 acting in place of backing 26 to prevent shattering of panel 240 in its central region.

What is claimed is:

1. a shatter-proof rear vision mirror assembly including a mounting, a casing, a mirror panel and a pliant foamed backing between said casing and panel, wherein the improvement comprises: said casing being pre-formed from suitable plastic material, such as polypropylene or polyvinyl chloride, molded with said mounting in situ, to form an enlarged recessed central wall portion housing said mounting, a cavity, an internal peripheral groove, and outstanding internal wall portions, said backing being formed from suitable self-foaming liquid, such as polyurethane, poured into said cavity prior to installation of said panel, said panel being installed, by inserting the same into said groove and by positioning the same against said internal wall portions, to close said casing over said liquid and to act with said casing as a mold confining said liquid during foaming, and following said foaming said backing filling said cavity between and bonded to said casing and panel.

2. The assembly of claim 1 wherein said central wall portion is provided with an inset socket housing said mounting separate from said backing and outstanding internal reinforcing ribs radiating from said socket, said internal wall portions divide said cavity into two outer portions and a central portion opposite said ribs and include lugs supporting said panel and recesses between said lugs, said panel is snapped into said groove, and said backing is formed by foaming of said liquid throughout each of said cavity portions and recesses following said installation of said panel.

3. The assembly of claim 1 wherein said internal wall portions divide said cavity into outer portions and a central portion housing said mounting within said central wall portion, separate from said backing, which is formed by foaming of said liquid throughout said outer cavity portions only.

4. The assembly of claim 3 wherein the back of said panel is reinforced by tape spanning said central cavity portion and internal wall portions.

5. A method of fabricating a shatter-proof rear vision mirror assembly including a mounting, a casing, a mirror panel and a pliant foamed backing between said casing and panel, wherein the improvement comprises, in sequence: providing said casing pre-formed from suitable molded plastic material, such as polyprophylene or polyvinyl chloride, molded with said mounting in situ, to form an enlarged recessed central wall portion housing said mounting, a cavity, an internal peripheral groove, and outstanding internal wall portions, pouring suitable self-foaming liquid, such as polyurethane, into said cavity, installing said panel, by inserting the same into said groove and positioning the same against said internal wall portions, to close said casing over said liquid and to act with said casing as a mold confining said liquid during foaming, and foaming of said liquid to form said pliant backing filling said cavity between and bonded to said casing and panel.

6. The method of claim 5 wherein said central wall portion is provided with an inset socket housing said mounting separate from said backing and outstanding internal reinforcing ribs radiating from said socket, said internal wall portions divide said cavity into two outer portions and a central portion opposite said ribs and include lugs supporting said panel and recesses between said lugs permitting said liquid to foam throughout each of said cavity portions following snapping of said panel into said groove.

7. The method of claim 5 wherein said internal wall portions divide said cavity into two outer portions and a central portion housing said mounting within said cental wall portion separate from said backing, and said liquid is poured into said outer cavity portions only, followed by snapping of said panel into said groove and said foaming of said liquid in said outer cavity portions only.

8. The method of claim 7 wherein the back of said panel is reinforced by tape spanning said central cavity portion and said internal wall portions.

* * * * *

UNITED STATES PATENT OFFICE
CERTIFICATE OF CORRECTION

Patent No. 3,776,618                          Dated December 4, 1973

Inventor(s) RONALD C. PERISON, SR.

It is certified that error appears in the above-identified patent and that said Letters Patent are hereby corrected as shown below:

Claim 1, line 1: after "1.", "a" should be -- A --;

Claim 3, line 2: after "into", insert -- two --.

Signed and Sealed this

Thirteenth Day of July 1976

[SEAL]

Attest:

RUTH C. MASON
Attesting Officer

C. MARSHALL DANN
Commissioner of Patents and Trademarks